(12) United States Patent
Metts, IV et al.

(10) Patent No.: US 7,213,866 B2
(45) Date of Patent: May 8, 2007

(54) SOFT TOP FOR VEHICLES

(76) Inventors: Carey Gregory Metts, IV, 2722 Bedford St., Burlington, NC (US) 27215; Scott Edward Showerman, 2319 Westover Ter., Burlington, NC (US) 27215; Robert Willets Powell, 1702 Hawthorne Land, Burlington, NC (US) 27215; Dhaval Amin, 1914 Trail Two #3B, Burlington, NC (US) 27215; Ronald L. Moore, 1505 E. Main St., Unit B, Richmond, VA (US) 23219; Clarence Wayne Farrell, 802 Driftwood Dr., Gibsonville, NC (US) 27249

( * ) Notice: Subject to any disclaimer, the term of this patent is extended or adjusted under 35 U.S.C. 154(b) by 0 days.

(21) Appl. No.: 10/876,855

(22) Filed: Jun. 25, 2004
(Under 37 CFR 1.47)

(65) Prior Publication Data

US 2005/0285415 A1    Dec. 29, 2005

(51) Int. Cl.
*B60J 7/08* (2006.01)
(52) U.S. Cl. .................... 296/102; 296/107.09
(58) Field of Classification Search ................ 296/102, 296/191, 107.01, 107.09; 160/10, 368.1, 160/370.21; 40/575, 737, 591, 592
See application file for complete search history.

(56) References Cited

U.S. PATENT DOCUMENTS

| | | | |
|---|---|---|---|
| 3,701,210 A * | 10/1972 | Smith | 40/591 |
| 4,070,781 A | 1/1978 | Sauer | |
| 4,217,970 A | 8/1980 | Chika | |
| D259,340 S * | 5/1981 | Stengel | D12/401 |
| 4,294,641 A | 10/1981 | Reed et al. | |
| 4,346,529 A | 8/1982 | Keller | |
| 4,521,458 A | 6/1985 | Nelson | |
| 4,639,034 A | 1/1987 | Amos | |
| 5,195,445 A * | 3/1993 | Riddles et al. | 114/201 R |
| 5,246,518 A | 9/1993 | Hale | |
| 5,255,464 A * | 10/1993 | Marecek | 40/591 |
| 5,398,437 A | 3/1995 | Bump, Jr. et al. | |
| 5,592,960 A * | 1/1997 | Williams | 135/87 |
| 5,643,387 A | 7/1997 | Berghauser et al. | |
| D384,324 S | 9/1997 | Barker | |
| 5,893,226 A * | 4/1999 | Sophocleous et al. | 40/591 |
| 6,101,751 A | 8/2000 | Hicks | |
| 6,105,502 A | 8/2000 | Wagner et al. | |
| 6,212,805 B1 * | 4/2001 | Hill | 40/443 |
| 6,217,958 B1 * | 4/2001 | Blyden et al. | 428/31 |
| 6,282,822 B1 | 9/2001 | Rinzler et al. | |
| 6,295,713 B1 | 10/2001 | Hilliard et al. | |
| 6,338,522 B1 * | 1/2002 | LeBlanc | 296/107.01 |

(Continued)

OTHER PUBLICATIONS

Bestop Product Catalogue web site, http://web.archive.org/web/19980522092106/www.bestop.com/catalog.html, 1998.*

(Continued)

*Primary Examiner*—Jason Morrow
(74) *Attorney, Agent, or Firm*—John H. Thomas, P.C.

(57) ABSTRACT

A fabric vehicle roof is made up of a panel of translucent material. Indicia is printed onto one or both sides of the fabric, with the indicia comprised of non-opaque dyes. The roof is further coated with a water resistant coating and, alternatively, ultraviolet light protectants and other additives.

6 Claims, 3 Drawing Sheets

U.S. PATENT DOCUMENTS

| | | | |
|---|---|---|---|
| 6,393,746 B1 | 5/2002 | Jacobson | |
| 6,481,788 B1 | 11/2002 | Moriyama et al. | |
| 6,505,880 B1 * | 1/2003 | Castro | 296/102 |
| 6,547,312 B2 | 4/2003 | Winkler | |
| 6,623,871 B2 | 9/2003 | Planche et al. | |
| 6,698,958 B2 | 3/2004 | Emery et al. | |
| 6,749,250 B1 * | 6/2004 | Reid | 296/136.07 |
| 6,749,641 B2 | 6/2004 | Cates et al. | |

OTHER PUBLICATIONS

Bestop Bikini® Tops website, http://www.bestop.com/index.php?s=8, 2005.*

One Step Ahead catalogue, p. 32, Jul. 13, 2001.*

Protest under 37 C.F.R. §1.291 by Ronald L. Moore, "dated" Jan. 6, 2006, including attatchments.

Collection of correspondence date May-Jun. 2003. (15 pages).

* cited by examiner

SOFT TOP FOR VEHICLES

The present invention relates to a fabric roof for a vehicle such as a truck, sport utility vehicle or boat. The fabric roof is translucent and has an image printed on to it made from transparent dyes.

BACKGROUND

Recreational vehicles are often very open in that they may have little or no tops or minimal coverage protecting a driver and passenger from outside air. A classic outdoor fun vehicle is a JEEP®. Many variations in custom construction are known for JEEP® vehicles including a fabric roof, also called a soft top. With a soft top, a JEEP® vehicle is still generally open around the sides and back of the vehicle. Similar soft-top type constructions are available with other trucks and off road vehicles. There are also similar constructions with respect to boats where small tops offer some protection from sun and rain but still allow free air flow around a captain and passengers.

Existing vehicle roofs are very limited in their visual creativity. Existing roofs are often made from vinyl or other opaque material to shield sun and water from an occupant in the vehicle. These materials also completely block sunlight from reaching the inside of the vehicle through the top. As a result, these types of tops have very drab appearances.

SUMMARY

Accordingly, it is an object of the present invention to provide a fabric roof that will allow light to pass into the vehicle and will have an image printed onto it that similarly allows light to pass through it.

In one example, a fabric vehicle roof comprises a panel of fabric adapted to constitute at least a portion of a vehicle roof. The fabric is comprised of a translucent material. First indicia is printed onto one side of the fabric, wherein the indicia is comprised of non-opaque dyes. The roof may further comprise second indicia printed onto the opposite side of the fabric from the first indicia. The first indicia and second indicia may be substantially mirror images of each other. They may be printed substantially in registration with each other. The fabric top may further include a water resistant coating applied to the fabric or an ultraviolet light protective coating applied to the fabric.

DETAILED DESCRIPTION

Figure 1:
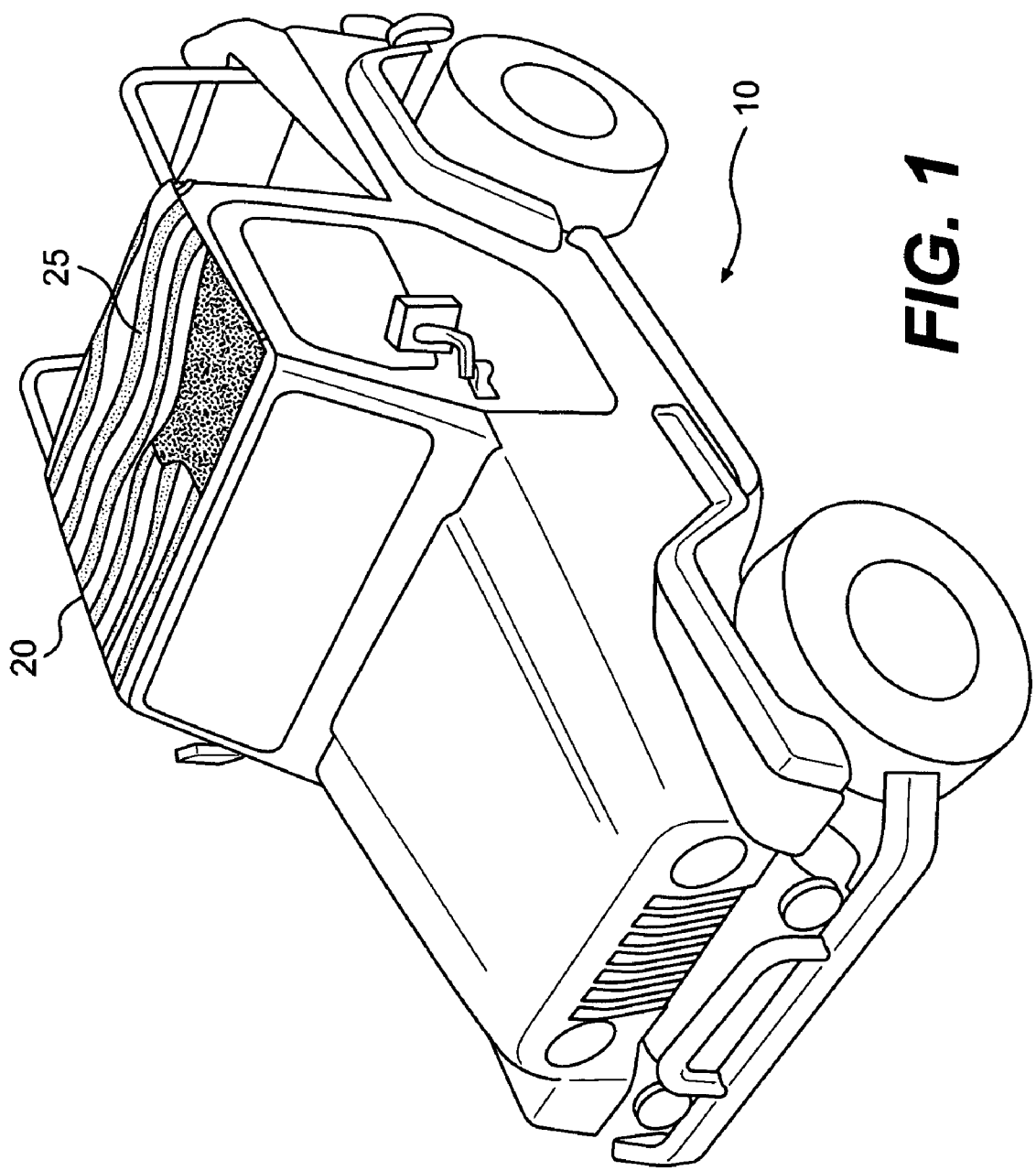
FIG. 1 is a perspective view of a vehicle having a soft top as described herein.

The present invention is directed to a fabric vehicle roof. The invention includes a panel of fabric that constitutes at least a portion of a roof of a vehicle. The fabric that makes up the panel is translucent. Indicia is printed on one or both sides of the fabric. The indicia is printed with a transparent, non-opaque ink. The invention will be discussed in terms of a soft top for a JEEP® vehicle, but it applies equally to other vehicle roofs such as for automobiles and trucks generally and for boats.

The fabric roof is made using a woven or non-woven material that is translucent. The material may be any natural or synthetic polymer including, but not limited to, polyester, polyethylene, polypropylene, nylon, rayon, acrylic, vinyl, cotton, etc. And mixtures thereof. The woven or non-woven material must be rugged and durable enough to meet the physical requirements of being a vehicle roof. Translucency depends on many factors such as fiber composition, fiber size, type of weave, type of non-woven process, tightness of weave, etc. For the purposes of this application, the term "translucent" material is defined as a material allowing between about 5% to about 50% of visible light, such as sunlight, to pass through the fabric material into the passenger area of the vehicle. In one example, the translucency is about 20%. One acceptable fabric material is an about 10 ounce polyester fabric.

Straps, hooks, snaps and other connection devices are all part of the fabric roof construction to secure the panel of fabric to the vehicle to serve as a roof or top of the vehicle. The connecting devices may releasably fix the fabric roof directly to a vehicle, or alternatively, to a frame that is then mountable on a vehicle.

Indicia is printed onto the translucent fabric panel. Indicia is printed using transparent or non-opaque dyes that allow light to pass through them. These transparent dyes that are acceptable for use are known to those of skill in the industry. The indicia may be any visual image such as, for instance, a flag, tye-dye design, photograph, words, colorful designs, etc. The indicia may be printed on one or both sides of the fabric panel. When printed on both sides of a fabric, mirror images may be printed onto the respective opposite sides to give the impression of depth of the image. Dual-sided printing can also increase the sharpness and brightness of the colors on the fabric. When printing mirror images on opposite sides of a fabric, the mirror images may be in registration with each other or they may be off-set to achieve a desired visual effect. Still further alternatively, it is possible to print different images onto the opposite sides of a fabric to achieve alternative visual effects.

In one example, the printing is applied by sublimation printing techniques involving the printing of a design on a backing sheet by conventional printing techniques. The design is formed from sublimation inks which are then transferred under heat and pressure to the face of the fabric roof. Suitable sublimation inks that are transparent or non-opaque for use in connection with the present roof have been formulated using dye powders from Sensient mixed with resins and solvent vehicles to form an ink suitable for a given fabric.

The printing can be applied to the backing sheet using conventional printing techniques, including off-set printing, lithographic, photographic and silk screening techniques. Preferably, in order to achieve the highest possible definition, the images are applied to the backing sheet using the sublimable ink by photographic or lithographic techniques. Once the printing is formed on a backing sheet, it is transferred to one or the other or both sides of a fabric panel by conventional sublimation techniques, which involve the application of heat along with pressure or vacuum to transfer the sublimation dyes from the backing sheet to the fabric substrate.

In addition to the indicia or dyes that may be printed onto the surface of the fabric panel, the fabric may also be treated with protective coatings. These coatings may include water repellents or UV protectants or anti-microbial additives. Because the fabric is used as a roof, it is preferred that there be a water repellent coating applied to it. In one example, a water repellent coating, Zonyl 7040 (Ciba Specialty Chemicals), is applied at a rate of 3–5% of the weight of the fabric. UV protectants may be added to protect both the colors from dulling and the fibers from deteriorating as a result of the corrosive effects of the UV rays. As an added bonus, the UV protectant may further supply protection for a passenger in the vehicle even though the fabric is translucent and allows some of the sunlight to pass through it.

The figures demonstrate one example of a vehicle roof in accordance with the teachings herein. As shown in FIG. 1, a JEEP® vehicle 10 includes a soft top 20. The soft top 20 is made up of fabric that is translucent. The fabric top 20 also has indicia 25 printed onto it. In this case, the indicia 25 is a flag design.

Figure 2:
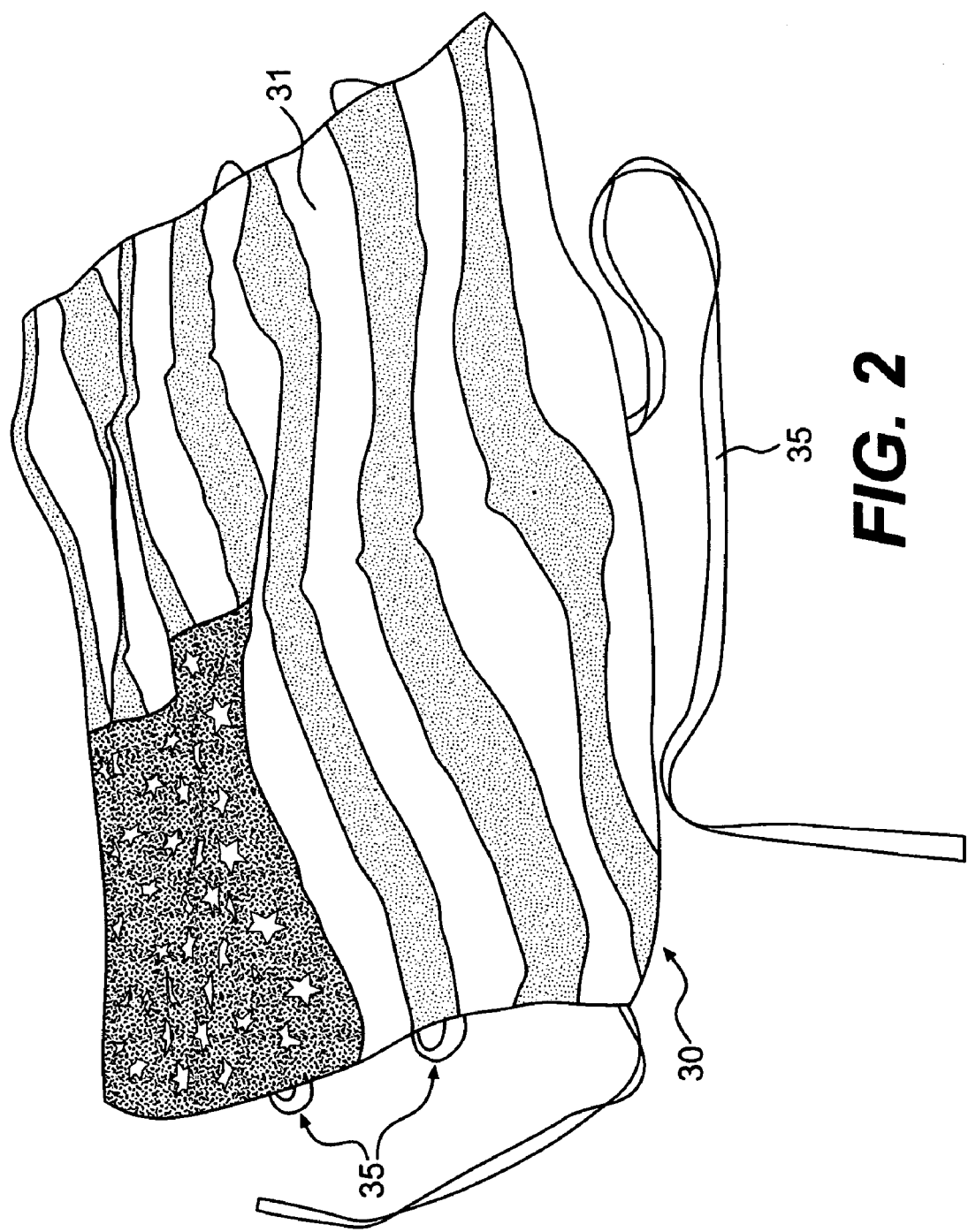
FIG. 2 is a perspective view of the roof, unmounted, as described herein.
Figure 3:
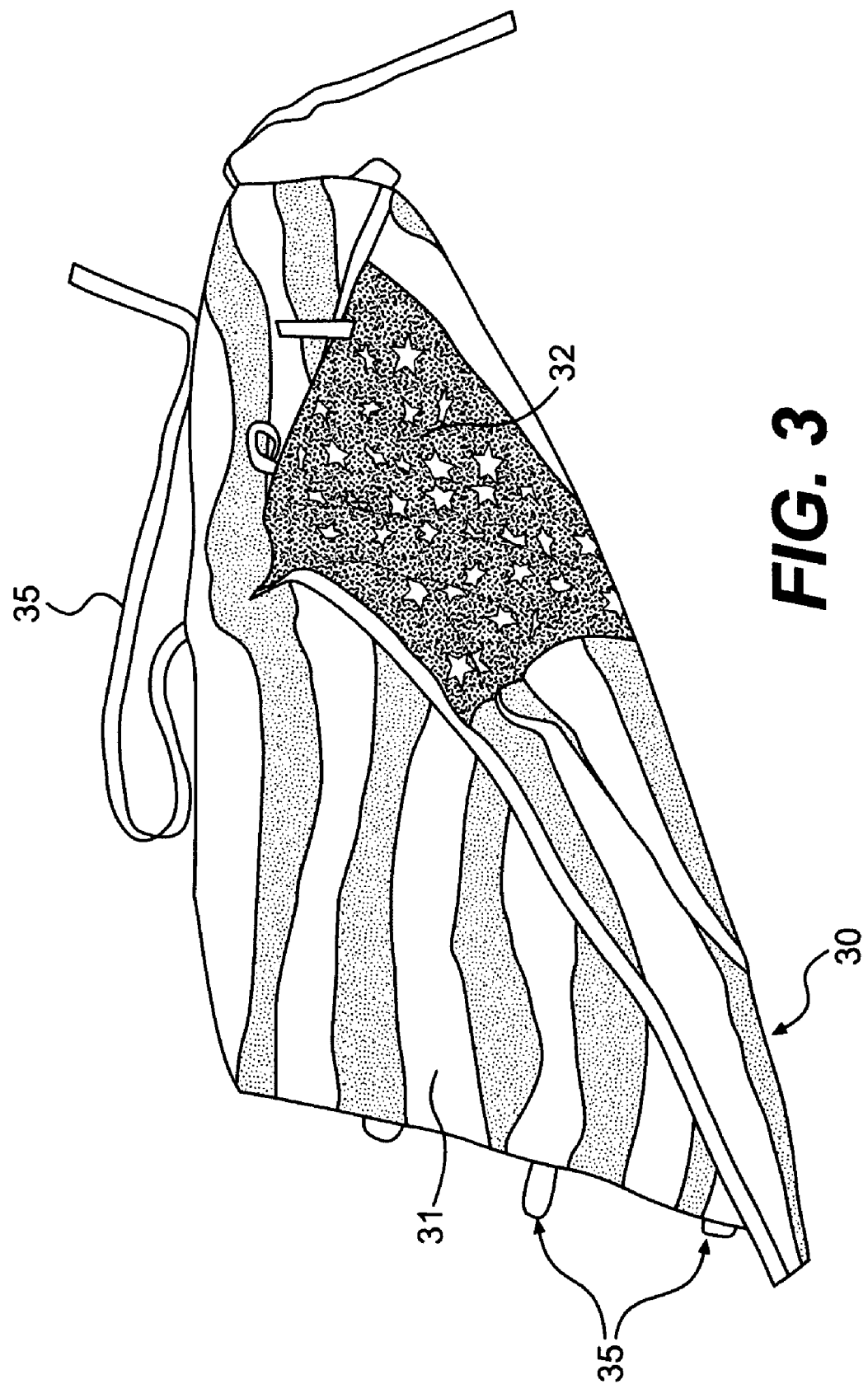
FIG. 3 is another perspective view of the roof, unmounted, as described herein.

FIG. 2 is a drawing of the roof 30, not mounted on any vehicle. The roof 30 includes a top side 31 and bottom side 32. An image such as the flag image as shown may be printed on either or both sides 31 and 32 of roof 30. Straps 35 are used to secure the roof 30 to a vehicle or a frame mountable on a vehicle. FIG. 3 demonstrates that indicia is printed on both sides 31 and 32 of a fabric.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A fabric vehicle roof construction consisting of:
   a panel of fabric adapted to be mounted onto a vehicle and having a size adapted to be a vehicle roof, wherein the fabric is comprised of a non-mesh translucent material and first indicia printed onto one side of the fabric, wherein the indicia is comprised of non-opaque dyes;
   connection devices for securing the panel of fabric to a vehicle; and
   wherein the fabric vehicle roof construction constitutes the entire roof of a vehicle.

2. A fabric vehicle roof as described in claim 1, wherein the fabric further comprises second indicia printed onto the opposite side of the fabric from the first indicia.

3. A fabric vehicle roof as described in claim 2, wherein the first indicia and second indicia are substantially mirror images of each other.

4. A fabric vehicle roof as described in claim 3, wherein the first indicia and second indicia are printed substantially in registration with each other.

5. A fabric vehicle roof as described in claim 1, further comprises a water resistant coating applied to the fabric.

6. A fabric vehicle roof as described in claim 1, wherein the fabric further comprises further comprising an ultraviolet light protective coating applied to the fabric.

* * * * *